United States Patent
Stanley

(10) Patent No.: US 7,214,014 B2
(45) Date of Patent: May 8, 2007

(54) CARGO TIE-DOWN SYSTEM

(76) Inventor: David J. Stanley, 256 Gold Claire Ter., Colorado Springs, CO (US) 80904-4290

( * ) Notice: Subject to any disclaimer, the term of this patent is extended or adjusted under 35 U.S.C. 154(b) by 57 days.

(21) Appl. No.: 10/945,017

(22) Filed: Sep. 21, 2004

(65) Prior Publication Data

US 2005/0031432 A1 Feb. 10, 2005

Related U.S. Application Data

(62) Division of application No. 10/318,505, filed on Dec. 14, 2002, now Pat. No. 6,851,902.

(51) Int. Cl.
*B60P 7/08* (2006.01)
(52) U.S. Cl. .......................... 410/97; 410/96; 410/100
(58) Field of Classification Search ............ 410/10–11, 410/23, 34, 96, 97, 100, 116; 24/68 CD, 24/302, 265 CD; 248/499
See application file for complete search history.

(56) References Cited

U.S. PATENT DOCUMENTS

| | | | | |
|---|---|---|---|---|
| 3,961,585 A | * | 6/1976 | Brewer | ........................ 410/97 |
| 5,980,173 A | * | 11/1999 | Danekas et al. | ............... 410/99 |
| 6,851,902 B2 | * | 2/2005 | Stanley | ........................ 410/97 |

* cited by examiner

*Primary Examiner*—Stephen Gordon
(74) *Attorney, Agent, or Firm*—Richard W. Hanes; Hanes & Schutz, LLC

(57) ABSTRACT

A cargo restraint system comprising, a tie-down assembly of restraining tie-down arms having interconnected common proximal extremities and a plurality of distal extremities, the tie-down assembly arranged to form an angle between each arm, the vertex of the angle being congruent with the common proximal extremities, with a first fastener secured to the arms at the vertex of the angle and a second fastener secured to each of the distal extremities of the arms. Preferably, each of the arms carries a third fastener or connecting eye intermediate the first and second fasteners.

3 Claims, 5 Drawing Sheets

CARGO TIE-DOWN SYSTEM

This application is a Divisional Application of U.S. application Ser. No. 10/318,505 filed on Dec. 14, 2002, now U.S. Pat. No. 6,851,902, issued Feb. 8, 2005.

FIELD OF THE INVENTION

The present invention relates to a method and apparatus for restraining cargo that is being transported on a truck, a railroad flat car or in an aircraft.

BACKGROUND OF THE INVENTION

Increasing concern about the safety and efficiency of state-of-the-art methods of restraining in-transit cargo has led to increased government regulation and changing industry practice. It is recognized that continued reliance on past practices and currently available equipment will lead inevitably to the continuation of shifting loads, damaged goods and accidents resulting from freight falling onto a highway from a transporting vehicle.

The majority of current cargo restraint systems comprise one or more belts that cover the load and are attached at each of their ends to anchoring attachments along the edge of or embedded in the surface of the bed of the transport device, whether rail, air or highway vehicle. Using more belts or straps to better secure the load is impractical because the number of anchor points on existing transports limits the number of belts and their effective spacing. In addition, as the height of the cargo increases, so does the instability and ineffectiveness of the restraining system. Furthermore, while presently available straps or belts may be suitable for securing containerized or non-containerized cargo, they do not allow for proper retention of stacked cargo, that is, cargo that is piled onto cargo that is already secured with all of the means that are available. Instances of multiple load packages that are of divergent shapes, sizes and character that must be stacked one on top of the other occur frequently in military applications. For example, a rigid container may be secured to the bed of a truck with available straps and a soft load of tents may be placed on top of the container. In such a case the surface anchoring attachments for restraining belts or straps to secure the superimposed load are either not available or are too widely spaced laterally from the soft load to obtain an effective purchase between the load and the securing straps or restraining network.

Accordingly, it is the primary objective of the present invention to provide a tie-down system for in-transit cargo that prevents articles from shifting on or within, or falling from the transporting device which can be a road vehicle, all terrain vehicle, ship, railroad car or aircraft.

A second object of the invention is to provide a cargo tie-down apparatus that multiplies the number of anchoring points for attachment of cargo restraints.

Another object of the invention is to provide a tie-down system that places the additional anchoring points closer to the higher load elements of stacked cargo for an improved wrap of the load-restraining straps around the top and sides of the stacked load to prevent shifting and movement of the load.

A further object of the invention is to provide a load securement system that will allow upper and lower elements of a total load to be separately secured but with common anchoring points, permitting, among other things, the upper load to be off-loaded without disturbing the securement of the lower portion of the load.

Another object of the invention is to increase the securement and stability of loads that are placed on vehicles that are required to traverse rough terrain.

Yet another object of the invention is to provide a novel method of tying down cargo on a transport device that prevents articles from shifting on or within, or falling from the transporting device.

Other and further objects, features and advantages of the tie-down system of the present invention will become apparent upon a reading of the following description of a preferred form of the invention.

SUMMARY OF INVENTION

The apparatus of the present invention includes a multi-armed tie-down strap, where the arms angularly converge to a common vertex that is equipped with a single fastener for attachment to one of the anchoring points located on or in the bed of the transport device, such as a flat bed truck, ship, railroad car or aircraft. The free or distal ends of the tie-down strap arms are each provided with a connector that is adapted to connect to one end of a load-restraining strap, belt, rope, cable, net or similar means. Preferably, each of the tie-down strap arms carries a secondary connector for fastening to the end of a second or supplementary load-restraining strap. With the use of the multi-armed tie-down straps each of the anchoring points of the transport device may be multiplied by two, four, six or more. Interconnecting or stacking two of the multi-arm tie-down straps between the transport anchoring point and the load-restraining straps may multiply the single anchoring point even further.

DETAILED DESCRIPTION OF THE INVENTION

Figure 1:
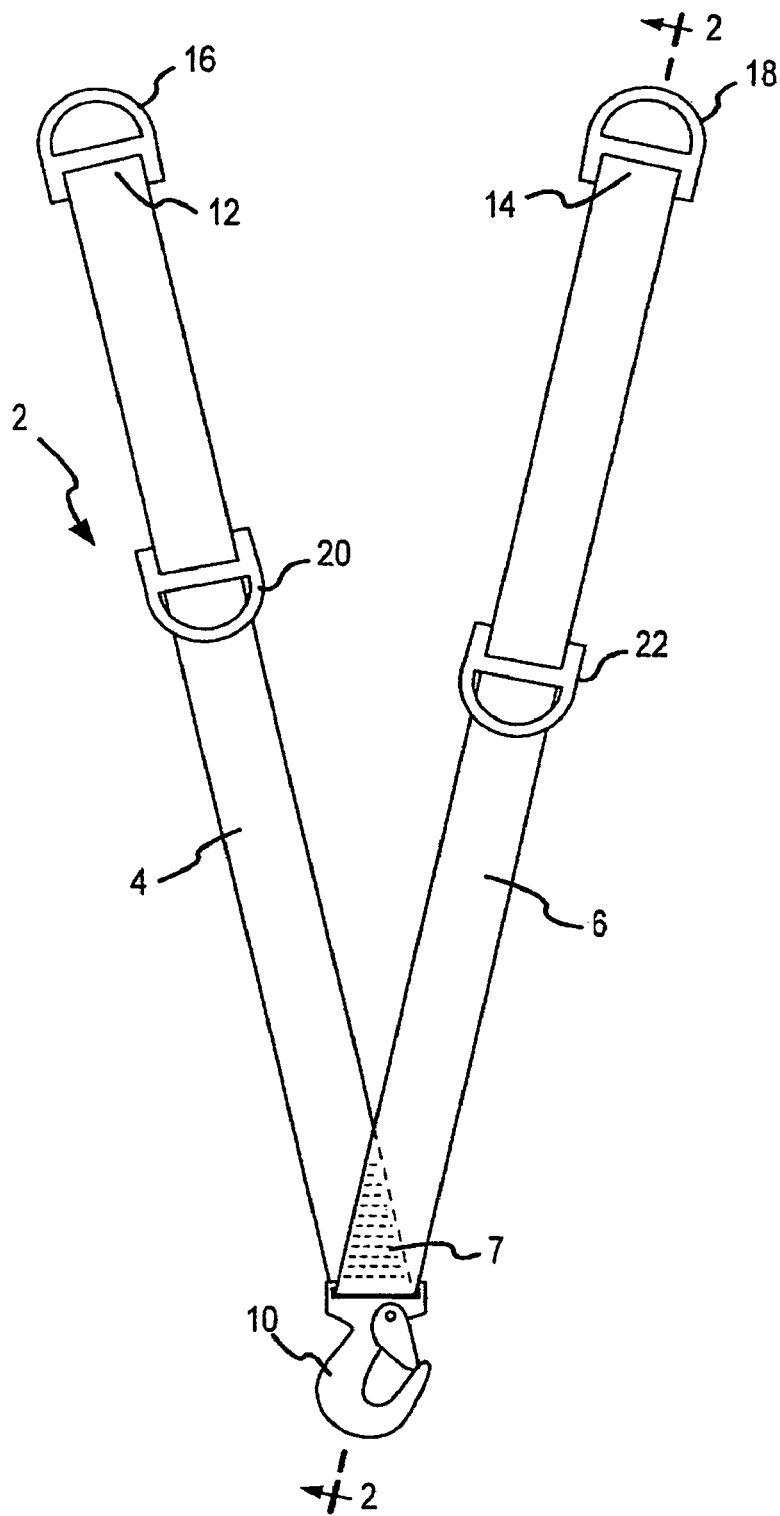
FIG. 1 is a front view of the multi-arm tie-down strap of the preferred form of the present invention having two arms that form a V.
Figure 2:
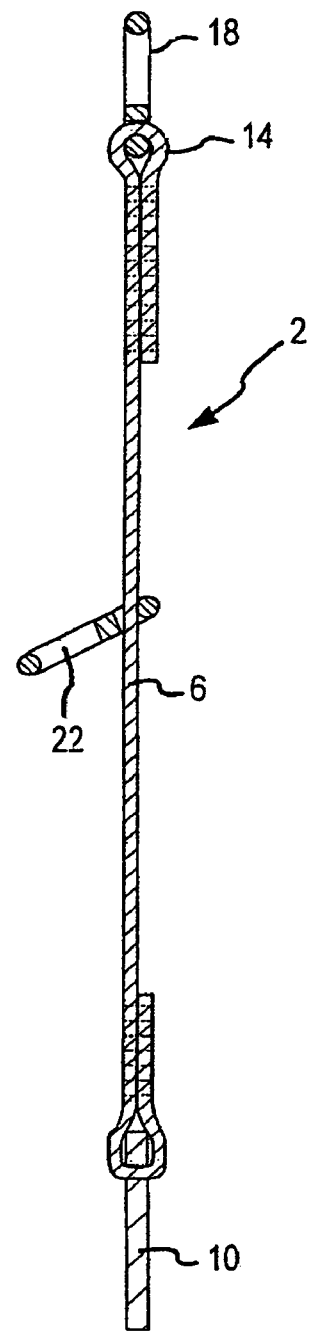
FIG. 2 is a cross section of the tie-down strap taken along lines 2—2 of FIG. 1.

The preferred form of the multi-armed tie-down assembly 2 of the present invention is shown in FIGS. 1 and 2. This embodiment of the invention contemplates two arms comprising straps 4 and 6 of equal length arranged in a "V" shape with their common ends forming the vertex 7 of the "V" angle. The common ends of the straps 4 and 6 are sewn or otherwise fastened together at the vertex 7 and a hook fastener 10 is attached to the common ends by a familiar slot connection. Although the description of the invention and the accompanying claims will describe the multi-armed tie-down assembly as having "straps" forming the arms of the apparatus, any tension strength device or material will work. Such other arm material may include webbing, rope, cable, chain or belting to cite a few. The common interconnected ends of the arm straps that form the vertex 7 of the "V" shape may be referred to as the proximal end of the tie-down assembly 2. The "free" ends 12 and 14 of the respective arm straps 4 and 6 may be referred to as the distal ends of the straps.

Clasps or eye connectors 16 and 18 are attached to the distal ends of the arm straps 4 and 6. The arm straps 4 and 6 slidably carry a second pair of clasps or buckle frames 20 and 22. While shown in the preferred form of the invention as being slidably connected to the straps 4 and 6, the second pair of clasps 20 and 22 can be secured to a fixed location on the straps 4 and 6. The slidable connection is preferred because there may be circumstances where one of the secondary connectors is not used and if it is slidable on the arm strap it can be gotten out of the way so that it will not interfere with other connections. However, if fixed, the location would preferably be at or near the distal end of the strap that carries the connector.

Figure 7:
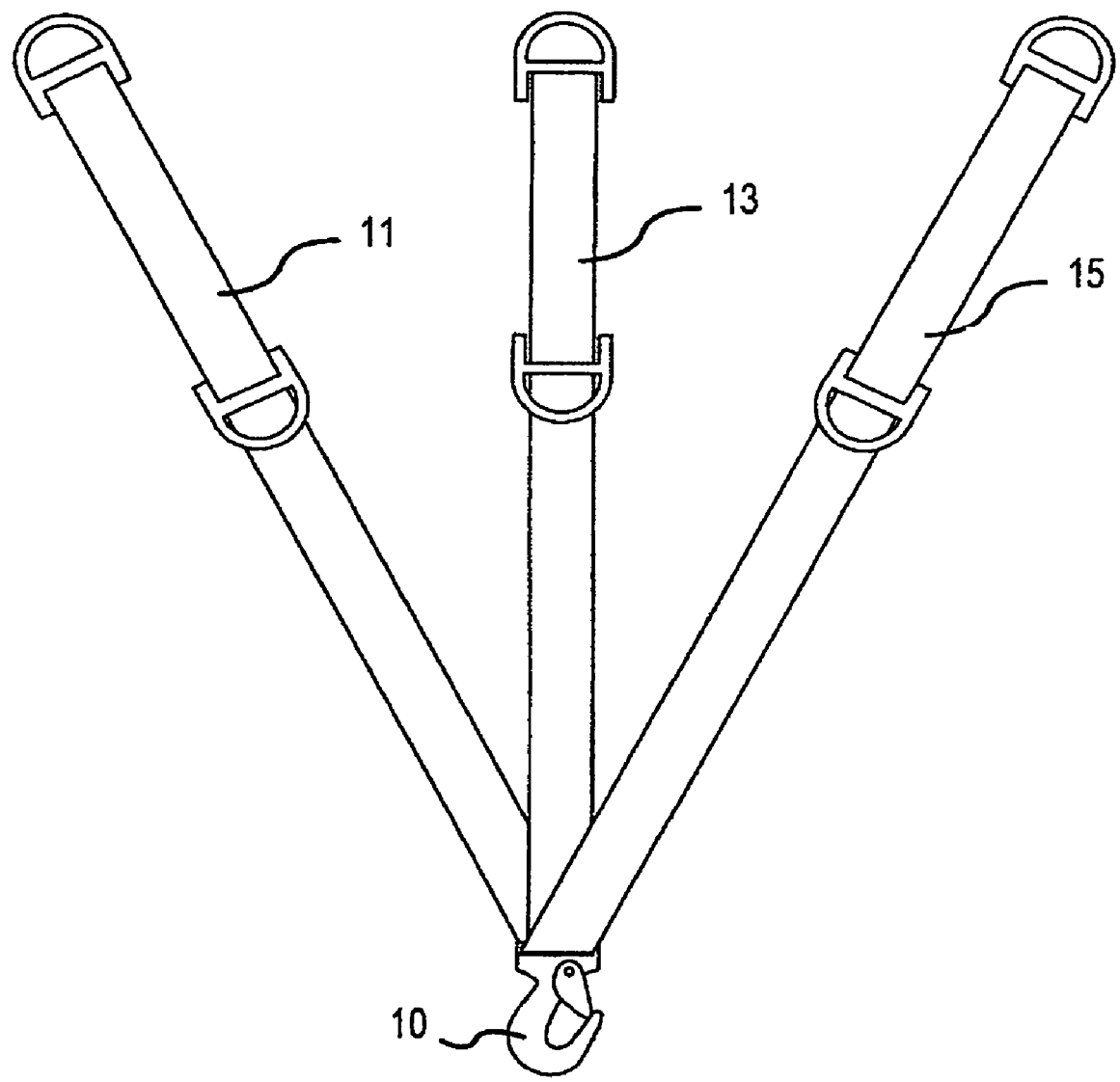
FIG. 7 is a front view of an alternative embodiment of the multi-arm tie-down strap where three arms are provided with a common vertex.

Although the preferred form of the invention contemplates a two arm tie-down assembly, as shown in FIGS. 2–5 of the accompanying drawings, three or four angularly interrelated arms whose proximal ends are interconnected at a common point with a fastener are possible alternative embodiments. FIG. 7 shows such an alternative embodiment having three angularly interrelated arms 11, 13 and 15. When more than two arm straps are provided each arm has similar characteristics and similar connectors as described for the "V" embodiment of FIGS. 1 and 2. Such arrangements would multiply the number of anchor points beyond the doubling provided by the preferred two-arm "V" assembly.

Figure 3:
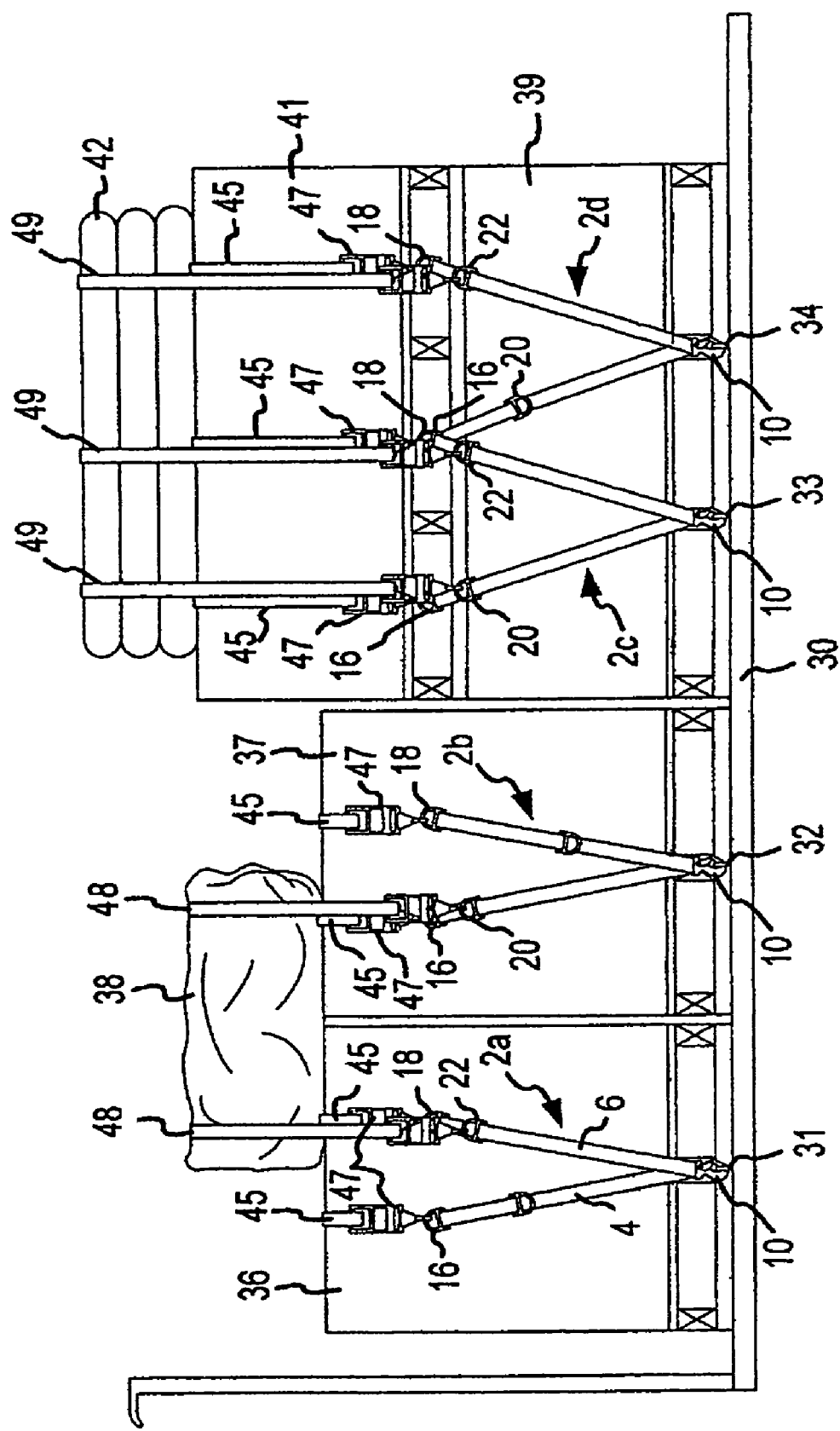
FIG. 3 is a side view of a representative stacked load secured to the bed of a truck with multiple load-restraining straps that are attached to respective arms of the tie-down strap of the present invention.
Figure 4:
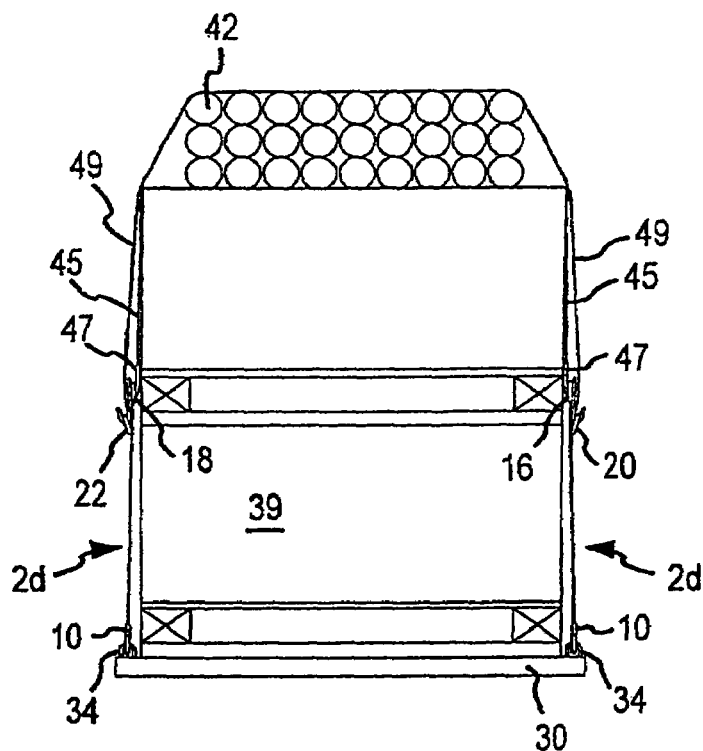
FIG. 4 is a rear end view of the load illustrated in FIG. 3.
Figure 5:
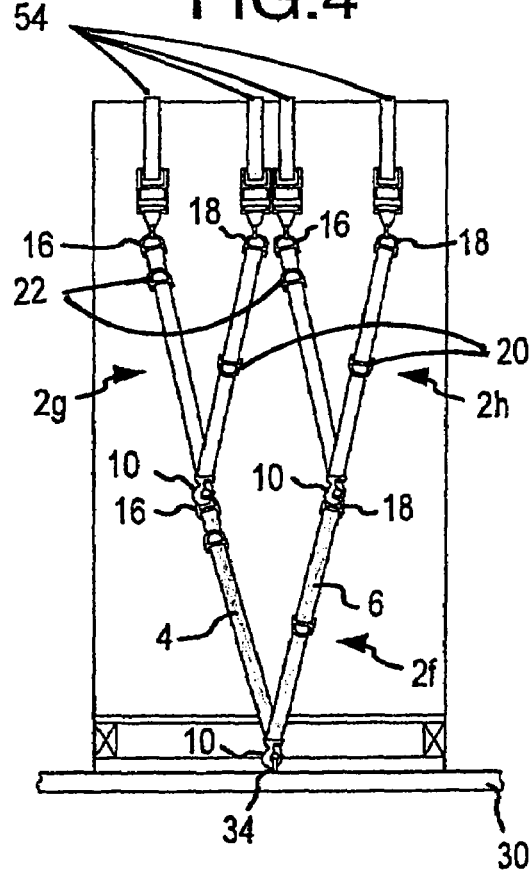
FIG. 5 is a side view of a multiple character stacked load showing the use of stacked tie-down straps to further multiply the available anchoring points for attachment of load-restraining straps.

To illustrate and explain possible uses of the multi-arm tie-down assembly 2, reference is made to FIGS. 3–5. FIG. 3 illustrates a multi-character palletized load situated on the bed 30 of a truck (not shown). The truck bed is assumed to have four anchoring points 31, 32, 33 and 34 on each of its sides. The cargo consists of two tall palletized containers 36 and 37 on top of which is stacked a soft package 38. To the rear of the tall containers is a single shorter palletized container 39 on top of which is stacked another similar container 41 on top of which is stacked a third type of load 42. Four tie-down assemblies 2 are employed on each side of the truck bed with the vertex fasteners 10 being connected to the anchoring points. A plurality of cargo tie-down straps 45 with ratchet end attachments 47 are shown in their securing positions over the containers 36, 37 and 41.

Two ratchet cargo tie-down straps 45 embrace the top of the front container 36 with the ratchet ends of those cargo tie-down straps interconnected to the distal end connectors 16 and 18 of the tie-down assembly 2a. Similarly, two cargo tie-down straps 45 secure the load element 37 by being attached to the distal end connectors 16 and 18 of the tie-down assembly 2b. Ratchet ended cargo tie-down straps 48 enfold the stacked soft load 38. The ends of the straps 48 are attached to the secondary fasteners 22 and 20 respectively of the tie-down assemblies 2a and 2b.

The rear load elements 39, 41 and 42 are similarly secured with three cargo tie-down straps 45 embracing the top of the upper container 41 and being connected to the distal end connectors 16 and 18 of tie-down strap assembly 2c and distal end connectors 16 and 18 of the fourth tie-down assembly 2d. The upper stacked load element 42 is secured by three cargo tie-down straps 49 that are respectively connected to the secondary connectors 20 and 22 of tie-down strap assembly 2c and to the secondary connector 22 of tie-down strap assembly 2d. The side of the truck bed not shown is similarly arranged and connected.

If the load requires securement with significantly more load-restraining cargo tie-down straps than there are available anchor points on the transport device, it is possible to stack, or connect in series, two levels of the multi-arm tie-down straps assemblies, as shown in FIG. 5. Thus, instead of multiplying the anchoring point by two with the use of one of the inventive tie-down straps assemblies, the use of three tie-down straps assemblies on two levels provides four anchoring points. As seen in FIG. 5, connecting the vertex fasteners 10 of two tie-down straps assemblies 2g and 2h to the distal end connectors 16 and 18 of a single tie-down strap assembly 2f accomplishes the "stacking" of tie-down straps assemblies in two levels. The vertex fastener 10 of the single tie-down strap assembly 2f is connected to an anchoring point on the transport device.

Figure 6A:
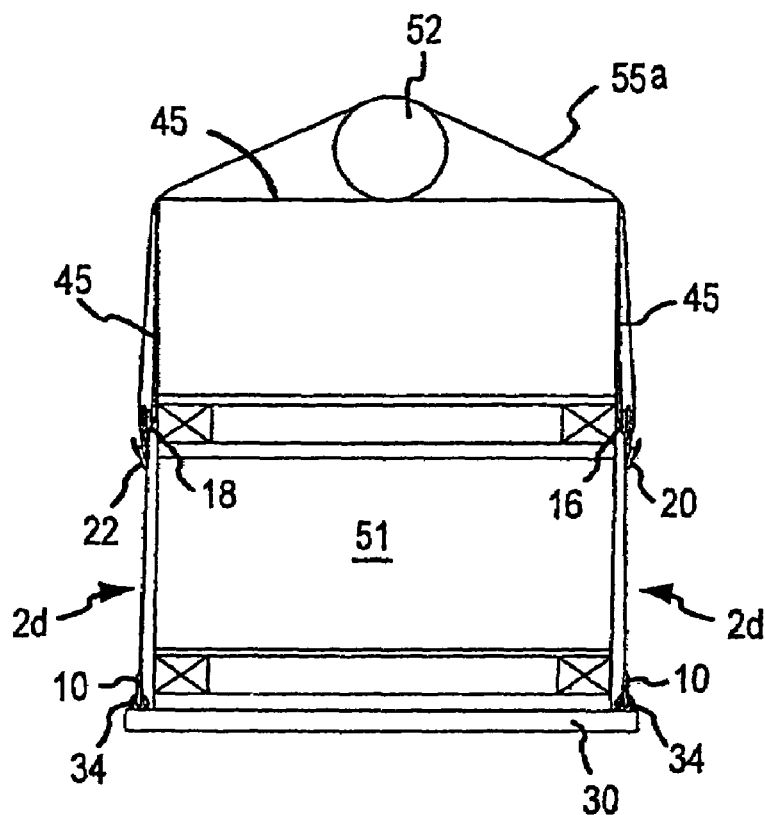
FIG. 6a is a rear view of a multiple character stacked load showing the use of the tie down straps of the present invention applied to the lower portion of the load and with the top portion secured with a traditional long tie-down strap.
Figure 6B:
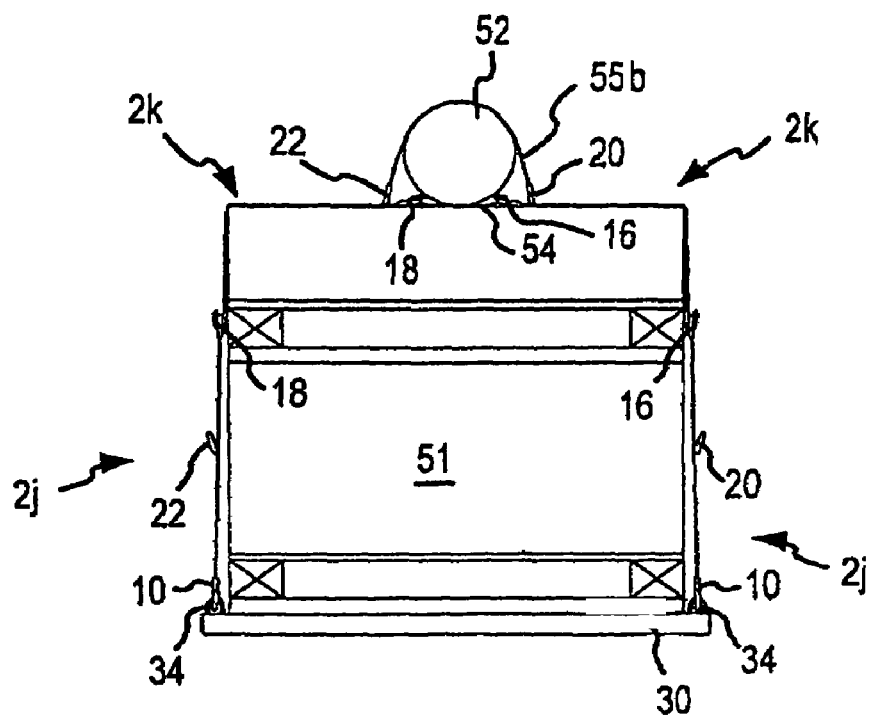
FIG. 6b is a rear view of a multiple character stacked load showing the use of the tie down straps of the present invention applied to both the lower and upper portions of the load.

The stacking of tie-down assemblies has another important feature, as illustrated in FIG. 6b. Where narrow load elements 52 are piled on top of wider cargo, the cargo tie-down straps 55a only make tangential contact with the top load element 52, as seen in FIG. 6a. This limited engagement may provide the required downward force on the top load element, but very little lateral support, permitting the top load 52 to shift sideways with undesirable results. By stacking the tie-downs as shown in FIG. 6b, the anchoring points 22 for the top load element 52 are brought in closer to the load so that the cargo tie-down strap 55b that covers the top load can closely wrap around the sides of the load, providing lateral support and improved securement of the top load element 52. Reference is made to FIG. 6b where the bottom tie-down assembly 2j is shown secured to the anchoring point 34 on the transport device. A second tie-down assembly 2k is attached to the first tie-down assembly in the manner already discussed in connection with FIG. 5. The second tie-down assembly 2k wraps around a portion of the bottom load element 51. A cargo tie-down strap 54 interconnects the right and left tie down assemblies 2k and is tightened by the ratchet ends on the cargo tie-down strap 54. The secondary connectors 22 on the tie-down assemblies 2k provide anchoring points for the cargo tie-down strap 55b that covers the sides and top of the top load element 52.

While several uses of the tie-down assemblies of the present invention have been illustrated and discussed, a variety of other configurations and arrangements may be employed to more safely and effectively secure in-transit cargo and thus satisfy the object of the invention.

The invention claimed is:

1. A system for restraining a unit of cargo onto a surface that has at least one anchoring point on each of opposing sides of the cargo unit, comprising, on respective said opposing sides of the cargo unit, at least one first tie-down assembly, each of which includes a plurality of angularly related restraining straps having a vertex and being interconnected at the vertex, where each of said straps includes first distally disposed fastening means and where each vertex includes fastening means for attachment to one of the at least one anchoring points on the surface, on said opposing sides of the cargo unit, at least two second tie-down assemblies, each of which includes a plurality of angularly related restraining straps having a vertex and being interconnected at the vertex of the respective second tie-down assembly, where each of the angularly related restraining straps of the second tie-down assemblies includes second distally disposed fastening means and where each vertex of the respective second tie-down assembly includes fastening means for attachment to one of the first distally disposed fastening means of the at least one first tie-down assembly, and at least one first cargo tie-down strap, each having fastening means on each end thereof for attachment to the second distally disposed fastening means of the at least two second tie-down assemblies on the respective opposing sides of the cargo unit.

2. The system of claim 1 and further including, intermediate fastening means carried by at least one of the restraining straps of the at least two second tie-down assemblies of angularly related restraining straps, disposed intermediate the vertex of each second tie-down assembly and the respective second distally disposed fastening means.

3. The system of claim 2 and further including, at least one second cargo tie down strap, each having fastening means on each end thereof for attachment to intermediate fastening means on the respective opposing sides of the cargo unit.

* * * * *